(12) United States Patent
Larsen (10) Patent No.: US 12,329,170 B2
(45) Date of Patent: Jun. 17, 2025

(54) MACHINE FOR FILLETING FISH (71) Applicant: MAREL SALMON A/S, Stovring (DK)

(72) Inventor: Palle Kaergaard Larsen, Vodskov (DK)

(73) Assignee: MAREL SALMON A/S, Stovring (DK)

( * ) Notice: Subject to any disclaimer, the term of this patent is extended or adjusted under 35 U.S.C. 154(b) by 60 days.

(21) Appl. No.: 18/556,505

(22) PCT Filed: Apr. 27, 2022

(86) PCT No.: PCT/EP2022/061171
§ 371 (c)(1),
(2) Date: Oct. 20, 2023

(87) PCT Pub. No.: WO2022/229248
PCT Pub. Date: Nov. 3, 2022

(65) Prior Publication Data
US 2024/0180178 A1    Jun. 6, 2024

(30) Foreign Application Priority Data
Apr. 28, 2021    (EP) ..................................... 21170951

(51) Int. Cl.
*A22C 25/00* (2006.01)
*A22C 25/08* (2006.01)
*A22C 25/16* (2006.01)

(52) U.S. Cl.
CPC ............. *A22C 25/16* (2013.01); *A22C 25/08* (2013.01)

(58) Field of Classification Search
CPC ................. A22C 25/16; A22C 25/08
USPC ........................................... 452/162
See application file for complete search history.

(56) References Cited

U.S. PATENT DOCUMENTS

| | | | | |
|---|---|---|---|---|
| 6,200,211 B1* | 3/2001 | Braeger | ............... | A22C 25/16 452/161 |
| 6,280,313 B1* | 8/2001 | Braeger | ............... | A22C 25/16 452/161 |
| 6,322,437 B1* | 11/2001 | Grabau | ............... | A22C 25/16 452/161 |
| 8,715,045 B2* | 5/2014 | Jacobsen | ............... | A22C 25/16 452/157 |
| 10,051,872 B2* | 8/2018 | Finke | ............... | A22C 25/16 |
| 2013/0295829 A1 | 11/2013 | Jacobsen et al. | | |

(Continued)

FOREIGN PATENT DOCUMENTS

| | | |
|---|---|---|
| CL | 201301283 A1 | 12/2013 |
| CL | 201702675 A1 | 4/2018 |
| CN | 110521757 A | 12/2019 |

(Continued)

OTHER PUBLICATIONS

Chilean Search Report from Corresponding Chilean Patent Application No. CL202303194, Sep. 9, 2024.

(Continued)

*Primary Examiner* — Richard T Price, Jr.
(74) *Attorney, Agent, or Firm* — Workman Nydegger (57) ABSTRACT

A machine for filleting fish includes a filleting station with two circular, rotating cutting blades arranged to perform plane cutting of the fish. To increase yield, the cutting blades are movable towards or away from each other by a linear actuator.

20 Claims, 7 Drawing Sheets

(56) References Cited

U.S. PATENT DOCUMENTS

2018/0153182 A1  6/2018  Finke et al.

FOREIGN PATENT DOCUMENTS

| | | |
|---|---|---|
| DE | 2541327 B1 | 11/1976 |
| DE | 2700068 A1 | 7/1978 |
| DE | 19745891 A1 | 4/1999 |
| GB | 2089642 A | 6/1982 |
| KR | 20090041636 A | 4/2009 |
| WO | 9809529 A2 | 3/1998 |
| WO | 9920115 A1 | 4/1999 |
| WO | 2012062331 A1 | 5/2012 |
| WO | 2018146203 A1 | 8/2018 |

OTHER PUBLICATIONS

Extended European Search Report from corresponding European Patent Application No. EP21170951.4, Oct. 27, 2021.
International Search Report from corresponding PCT Application No. PCT/EP2022/061171, Nov. 14, 2022.

\* cited by examiner

MACHINE FOR FILLETING FISH

INTRODUCTION

The present invention relates to a machine for cutting fillets from the vertebral columns of fish.

BACKGROUND

Fish filleting operations typically include removal of the heads and the fish entrails. Subsequently, the fish is split longitudinally and vertically into three pieces, i.e. two side-pieces, referred to herein as "fillets", and one intermediate piece referred to herein as "skeleton". The skeleton contains the vertebral column.

In the following context, the anatomy of the fish will be referred to as follows.

The dorsal part of the fish is the part extending upwardly from the vertebral column to the upper back of the fish. This part terminates upwardly by what is herein referred to as "margin of the dorsal part" of the fish, i.e. the margin of the dorsal part is the upper edge of the fish.

The ventral part of the fish is the part extending downward from the vertebral column and includes the abdomen or belly together with the tail part located between the abdomen and the tail. This part terminates downwardly by what is herein referred to as "margin of the ventral part" of the fish, i.e. margin of the ventral part is the lower edge of the fish.

The vertical centre plane is a virtual plane introduced for supporting definitions herein. The vertical centre plane is a longitudinally extending vertical plane intersecting through the middle of the vertebral column, centrally between the two fillets.

The skeleton is merely used for industrial purposes, e.g. for making fishmeal etc. while the fillets, with or without skin, represent the valuable part of the fish and may be further processed, e.g. by smoking.

In general, the process of filleting at least some fish species is widely automated. In existing machines, one or more knife arrangements cut the fish into fillets either by cutting from one end of the fish throughout the fish or by cutting partly from the margin of the ventral part and partly from the margin of the dorsal part of the fish. Most frequently, filleting machines are provided with one or more sets of two adjacent circular rotating knife blades. Obviously, the rotating knife blades perform a plane cut into the fish.

To prevent loss of valuable fish meat, some machines are provided with a set of circular knife blades being arranged to form an angle between the blades. In this way, the blades define a zone with a relatively open gap and a diametrically opposite zone with a relatively narrow gap. In this way, the blades can cut a triangular part out of the fish relatively close to the vertebral column. However, mainly since each blade performs a plane cut, relatively large amounts of the meat, especially in the margin of the ventral part of the fish, is cut off from the fillets and removed with the valueless skeleton.

In some machines, band knives are used for releasing the fillets from the vertebral column and from the dorsal ribs of the fish.

SUMMARY

It is an object to improve yield and the quality of fillets. For this and other objects, a machine and a method for filleting fish are provided. Other objects are to provide systems reducing the risk mechanical breakdowns; reducing filleting process failures e.g. by fish parts getting stuck in the machine; lowering the service time and thus provide a system being able to function for longer time.

The machine may comprise several filleting stations and may additionally comprise other processing stations, e.g. trimming stations arranged for trimming fins and/or fat and cartilage from the fish. Other processes, e.g. image capturing and quality control may also be part of the machine.

The filleting stations may be based on either plane cutting, typically rotating disks, and band knives which can perform curved cutting. Trimming stations are typically based on plane cutting, typically rotating disks.

The machine comprises at least one plane cut filleting station comprising:
- a first cutting blade arranged on one side of the vertical centre plane and configured for cutting the fish during rotation of the first cutting blade about a first rotation axis,
- a second cutting blade arranged on the opposite side of the vertical centre plane and configured for cutting the fish during rotation of the second cutting blade about a second rotation axis, and
- a gap control structure configured based on the detected width of the fish to change a gap between the first cutting blade and the second cutting blade while the fish is being cut.

For improving the ability to make precise cutting and particularly for filleting purpose, the plane cut filleting stations may be configured to maintain a fixed angle between the first cutting blade and the second cutting blade during changing of the gap. In that way, the gap can be adjusted while the angle between the blades is maintained.

The gap control structure may be configured to change the gap by linear movement of both cutting blades in an inwards direction towards each other or in an outwards direction away from each other. This allows fast control and transfer of relatively large forces with a good accuracy. Further, it may simplify the construction and increase the reliability e.g. compared to rotational movement of the cutting blades about a hinge point etc.

The gap control structure may e.g. be configured to change the gap by linear movement in a direction which is not perpendicular to the downstream direction. In one example, the gap control structure may be configured to change the gap by linear movement of each of the first and second cutting blades in a direction of the corresponding rotation axis, i.e. a direction which is perpendicular to the circular blades. This direction may form a non-perpendicular angle to the downstream direction, e.g. in the order of 80-85 degrees to the downstream direction.

The first rotation axis may be non-parallel with the second rotation axis. If the linear movement is in the direction of the rotation axes, that implies the movement of one of the circular blades to be in one direction, and the movement of the other circular blade to be in another direction.

One of the at least one plane cut filleting stations may form a ventral-filleting station arranged to cut the fish along a margin of the ventral part of the fish. Another one of the at least one plane cut filleting stations may form a dorsal-filleting station arranged to cut the fish along a margin of the dorsal part of the fish.

The gap control structure may be configured to change the gap by movement of both cutting blades symmetrically relative to the vertical centre plane. However, to increase yield, it may also be configured for a completely independent control of the first blade independent on the second blade, vice versa.

The machine may comprise a lifting structure for lifting the fish. This is relevant during the operation of the ventral-filleting station. When the fish is cut by the ventral-filleting station, it is typically only intended to cut the lengthwise last part near the tail, the abdomen part comprises ventral ribs and often it is desired to release the fillets from the ventral ribs by use of a more flexible band knife which can make curved cuts. If the front end of the fish is not lifted, the first and second cutting blades may accidentally cut through the ventral ribs making filleting with a subsequent band knife difficult or impossible.

The lifting structure may e.g. be defined by a plate which rotates around a drive shaft extending perpendicular to the plate.

A point, particularly a corner point, of the plate will thereby rotate along a circle periphery in the vertical centre plane. Herein, reference is made to this point being a "lifting point". This point is configured, during rotation, to sequentially engage and lift a vertebral column point along a lower edge of the vertebral column of a fish in the sequence of fish. Due to the rotation of the plate, it can move in contact with the vertebral column in the downstream direction and disengage the vertebral column point when it rotates and thereby moves to a lower level than the fish. Subsequently, by rotating further, it can engage and lift a vertebral column point along a lower edge of the vertebral column of a subsequent fish in the sequence of fish.

In one example, the lifting point slides relative to the vertebral column during the movement. In another example, the speed of the lifting point is adjusted to match the conveying speed of the fish, and in this case, the lifting point may become stationary with respect to the vertebral column point.

To protect the fish from damage and simultaneously ensure a firm grip during conveying of the fish and thus optimal control of the position of the first and second knife blades during cutting, the conveying system may comprise an adjustable entrance gap.

The conveying system may particularly form at least one endless belt on one side of the vertical centre plane, and at least one endless belt on the opposite side of the vertical centre plane.

Each of the belts extend between an upstream pulley and a downstream pulley, and the entrance gap is defined between the upstream pulleys.

The machine may comprise an entrance gap controller configured to read the detected width and to control a position of at least one of the upstream pulleys relative to the position of the other upstream pulley to change the entrance gap based on the width. This enables a good protection and firm grip and thus correct positioning of the fish when it travels through the machine.

When delivering the fillets and skeleton at the outfeed, the fillets are fragile, mainly because they are no longer supported by the skeleton. The machine may form an exit gap which is controllable for protecting the fillets and reducing damage.

The conveying system may therefore define an exit gap between the downstream pulleys for delivering the sequence of fish between the endless belts, and an exit gap controller configured to read the detected width and to control a position of at least one of the downstream pulleys relative to the position of the other downstream pulley to change the exit gap based on the width of the fish as detected upstream the exit gap, such as upstream of the entrance gap.

The conveying system may form a first section comprising a first endless belt on one side of the vertical centre plane, and a second endless belt on the opposite side of the vertical centre plane and wherein the machine comprises a second section downstream the first section and comprising a third endless belt on one side of the vertical centre plane, and a fourth endless belt on the opposite side of the vertical centre plane, wherein the first section extends in a first height and the second section extends in a second height different from the first height.

As mentioned previously, the machine may comprise trimming stations in addition to the filleting stations. One trimming station may e.g. be provided for trimming in the dorsal part, herein referred to as the dorsal-trimming station, and another may be provided for trimming in the ventral part, herein referred to as ventral-trimming station. The dorsal-trimming station may be arranged in one of the first and second conveying sections and the ventral-trimming station may be arranged in the other section of the conveying system. Particularly, the section of the conveying system where the dorsal-trimming station is located may be in a lower height than the section of where the ventral-trimming station is located, hereby giving more space to perform the trimming cuts.

In one example, the dorsal-trimming station is located upstream relative to the ventral-trimming station, and the first section of the conveying system is in a lower height than the second section of the conveying system.

As mentioned previously, it may be desirable to release the fillets from the ventral ribs and the vertebral column by a knife which can perform curved cuts. For that purpose, the machine may comprise a band knife structure arranged downstream relative to the at least one plane cut filleting station. The band knife may comprise two flexible, rotating, closed-loop, knife bands arranged to provide a curved cutting on opposite sides of a vertebral column of the fish while the fish is advanced between the two belts.

A pair of squeezing nippers may be arranged to provide a squeeze pressure on the right and left sides of the fish towards the two belts, e.g. by use of pneumatic actuator or spring actuators urging plates towards an outer surface of the fish.

A belly plate structure with two belly plates may be arranged between the right and left belly sides. The belly sides are pressed outwards towards the squeezing nippers by the belly plates. During this process, the gap between the belly plates changes depending on the size of the fish.

The machine may comprise a belly plate motor structure controlled based on the width of the fish to vary the belly plate gap between the belly plates depending on the width of the fish.

In this way, the belly plates can be controlled more precisely leading potentially to a better yield at the band knife.

At least one, but preferably all plane cut filleting stations may comprise a height control structure configured to change the height of the first cutting blade and the second cutting blade while the fish is being cut. The height adjustment may particularly be carried out with a fixed angle between the first and second cutting blade, particularly with a linear actuator.

A height detection mechanism may be placed at an upstream location relative to the filleting stations and configured for detecting the height of the fish, i.e. the dimension from the margin of the ventral part to the margin of the dorsal part.

The height control structure may be configured to change the height of the first cutting blade and the second cutting blade based on the detected height of the fish.

The machine may further comprise a length detection mechanism placed at an upstream location relative to the filleting stations and configured for detecting a length of the fish.

The gap control structure and/or the height control structure may subsequently use the length when changing the gap or the height of the first cutting blade and the second cutting blade.

The first cutting blade may be formed in a first cutting unit with at least a part of the gap control structure. More particularly, the first cutting unit may define a chassis to which a rotation motor and a displacement motor is fixed. These two motors cause respectively translation and rotation of the corresponding cutting blade, and it can be attached to and removed from the machine as one single component for easy service and repair.

To provide a slim, robust, and space optimized design, the first cutting unit may comprise a drive shaft extending in the direction of the first rotation axis, the drive shaft being connected to the cutting blade and being rotated by the rotation motor. The displacement motor may be arranged to displace the drive shaft and the cutting blade as one component, e.g. by displacing an outer tube in which the drive shaft is suspended.

The drive shaft may comprise an elongated tooth structure configured to engage with the rotation motor during the displacement and thereby allowing continuous rotation and cutting while displacing the blade sideways to adjust the gap.

The rotational engagement may comprise an engagement of a drive wheel of the rotation motor and an elongated cogwheel structure extending in the direction of the first rotation axis on an outer surface of the drive shaft.

The second cutting blade may be formed in a second cutting unit being identical to the first cutting unit or constitutes the first cutting unit mirrored in the centre plane. In total, the machine may e.g. comprise four such units, two constituting the dorsal-filleting station and two constituting the ventral-filleting station. Each unit may have a connector, e.g. a single plug, for power and signal communication with the machine and particularly for exchanging control signals with the computer control unit.

When installed or service, the technician my simply attach a unit and the computer control unit may e.g. initiate a synchronization procedure, where displacement motor is driven to an extreme-position so that the position is known to the control unit. Subsequently, the gap may be controlled by operation of one or both displacement motors of one of the dorsal and/or ventral-filleting stations.

In a second aspect, the disclosure provides a method of filleting fish by use of said machine. The method may comprise moving the first and second cutting blades towards each other or away from each other without changing the angle between the blades and while they are cutting the fish. The gap can hereby be adjusted dynamically through the cut of the dorsal part. Also, a dynamic adjustment of the cutting blades may be present when cutting the ventral part of the fish. By dynamically is meant "while the fish is being cut or measured".

In a third aspect, the disclosure provides a machine for filleting fish, the machine comprising:

- a conveying system configured to convey a sequence of fish in a downstream direction through at least one filleting station while each fish of the sequence of fish is oriented with a back side of the fish facing in an upwards direction and with right and left sides of the fish on opposite sides of a vertical centre plane,
- at least one filleting station arranged to cut the fish while the fish is conveyed, and
- at least one width detection mechanism placed at an upstream location relative to the filleting stations and configured for detecting a width of the fish, the machine comprising a lifting structure defining a lifting point rotatable along a circle periphery in the vertical centre plane, the lifting point configured during rotation to sequentially engage and lift a vertebral column point along a lower edge of the vertebral column of a fish in the sequence of fish, to move in contact with the vertebral column, e.g. in contact with the vertebral column point, in the downstream direction, to disengage the vertebral column, and to engage and lift a vertebral column point along a lower edge of the vertebral column of a subsequent fish in the sequence of fish.

In a fourth aspect, the disclosure provides a machine for filleting fish, the machine comprising:

- a conveying system configured to convey a sequence of fish in a downstream direction through at least one filleting station while each fish of the sequence of fish is oriented with a back side of the fish facing in an upwards direction and with right and left sides of the fish on opposite sides of a vertical centre plane,
- at least one filleting station arranged to cut the fish while the fish is conveyed, and
- at least one width detection mechanism placed at an upstream location relative to the filleting stations and configured for detecting a width of the fish, wherein the conveying system forms an endless belt on one side of the vertical centre plane, and an endless belt on the opposite side of the vertical centre plane, each of the endless belts extending between an upstream pulley and a downstream pulley, and wherein an entrance gap is defined between the upstream pulleys for receiving the sequence of fish between the endless belts, the machine further comprising an entrance gap controller configured to read the detected width and to control a position of at least one of the upstream pulleys relative to the position of the other upstream pulley to change the entrance gap based on the width of the fish.

In a fifth aspect, the disclosure provides a machine for filleting fish, the machine comprising:

- a conveying system configured to convey a sequence of fish in a downstream direction through at least one filleting station while each fish of the sequence of fish is oriented with a back side of the fish facing in an upwards direction and with right and left sides of the fish on opposite sides of a vertical centre plane,
- at least one filleting station arranged to cut the fish while the fish is conveyed, and
- at least one width detection mechanism placed at an upstream location relative to the filleting stations and configured for detecting a width of the fish, wherein the conveying system forms an endless belt on one side of the vertical centre plane, and an endless belt on the opposite side of the vertical centre plane, each of the endless belts extending between an upstream pulley and a downstream pulley, and wherein an exit gap is defined between the downstream pulleys for delivering the sequence of fish between the endless belts, the machine further comprising an exit gap controller configured to read the detected width and to control a position of at least one of the downstream pulleys relative to the position of the other downstream pulley to change the exit gap based on the width of the fish.

In a sixth aspect, the disclosure provides a machine for filleting fish, the machine comprising:
  a conveying system configured to convey a sequence of fish in a downstream direction through at least one filleting station while each fish of the sequence of fish is oriented with a back side of the fish facing in an upwards direction and with right and left sides of the fish on opposite sides of a vertical centre plane,
  at least one filleting station arranged to cut the fish while the fish is conveyed, and
  at least one width detection mechanism placed at an upstream location relative to the filleting stations and configured for detecting a width of the fish,
wherein the conveying system forms an upstream conveying section and a downstream conveying section, each conveying sections forming an endless belts on one side of the vertical centre plane, and another endless belt on the opposite side of the vertical centre plane, and the endless belts of one of the upstream section and downstream section extending in a higher level than the other one of the upstream section and downstream section.

In a seventh aspect, the disclosure provides a machine for filleting fish, the machine comprising:
  a conveying system configured to convey a sequence of fish in a downstream direction through at least one filleting station while each fish of the sequence of fish is oriented with a back side of the fish facing in an upwards direction and with right and left sides of the fish on opposite sides of a vertical centre plane,
  at least one filleting station arranged to cut the fish while the fish is conveyed, and
  at least one width detection mechanism placed at an upstream location relative to the filleting stations and configured for detecting a width of the fish,
the machine further comprising
  a band knife structure arranged downstream relative to the at least one plane cut filleting stations and comprising two flexible rotating closed-loop knife bands arranged to provide a curved cutting on opposite sides of a vertebral column of the fish while the fish is advanced between the two belts,
  a pair of squeezing nippers arranged to provide a squeeze pressure on the right and left sides of the fish towards the two belts,
  a belly plate structure comprising right and left side belly plates arranged to define a belly plate gap between the belly plates and arranged to press right and left sides of a belly part of the fish away from each other against the squeezing pressure, and
  a belly plate motor structure controlled based on the width of the fish to vary the belly plate gap between the belly plates depending on the width of the fish.

Any of the aspects described relative to the machine of the first aspect may apply also for the machine of the third through seventh aspect.

LIST OF DRAWINGS

In the following, embodiments of the disclosure will be described in further details with reference to the drawing in which.

DESCRIPTION OF EMBODIMENTS

Figure 1:
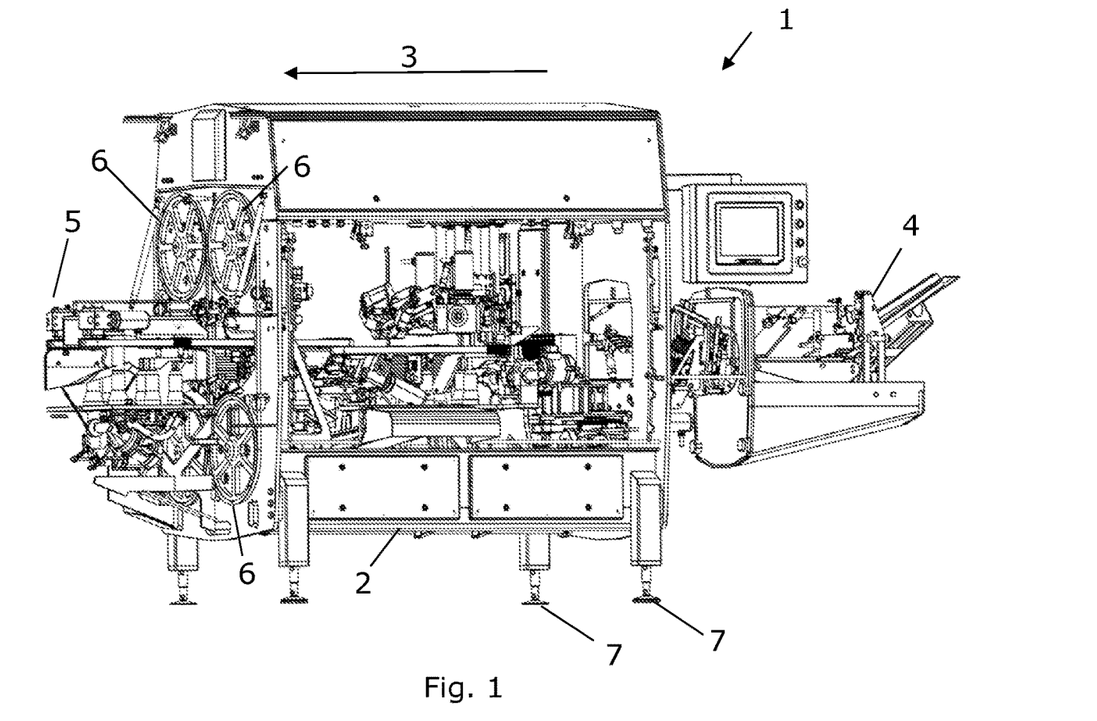
FIG. 1 illustrates a filleting machine.

Referring to FIG. 1, the filleting machine 1 comprises a frame 2, holding a conveying system arranged to convey a sequence of fish in a downstream direction, indicated by the arrow 3, from an infeed 4 through processing stations to an outfeed 5.

Each fish is conveyed through the machine and thus through several sequentially arranged processing stations. The processing stations may include filleting stations and trimming stations. In one example, the machine comprises a ventral-filleting station, a ventral-trimming station, a dorsal-trimming station, a dorsal-filleting station, and a band-knife filleting station configured to release the fillets from the ventral ribs, dorsal and ventral spines, and from the vertebral column. The band knife structure including the band pulleys 6, is visible on the rear side of the machine.

By definition herein, the height direction of the machine is the direction from the feet 7 and vertically upwards.

Figure 2:
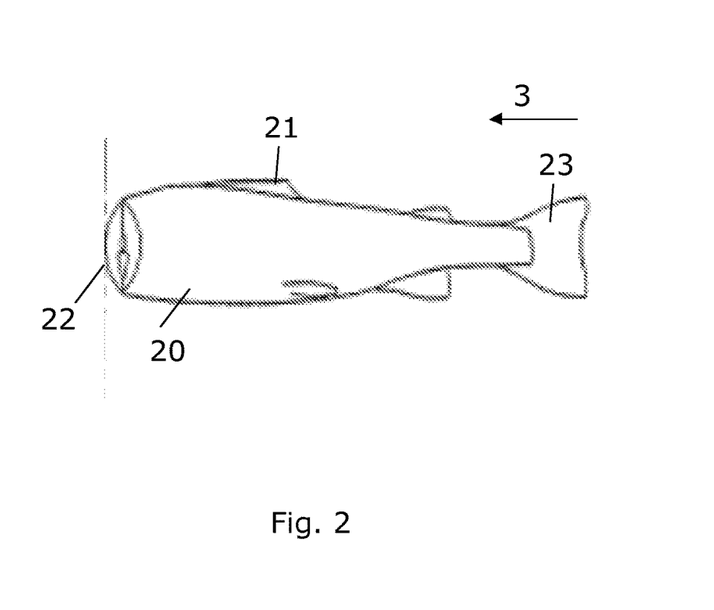
FIGS. 2-4 illustrate a fish with defined measures of the fish.

FIG. 2 illustrates that the fish 20 to be filleted is arranged such that the back fin 21 is upwards and the front 22 of the fish, without its head, facing in the downstream direction.

The fish has been gutted, and the head of the fish has typically been removed prior to the introduction of the fish into the machine. The tail 23 typically remains.

Figure 3:
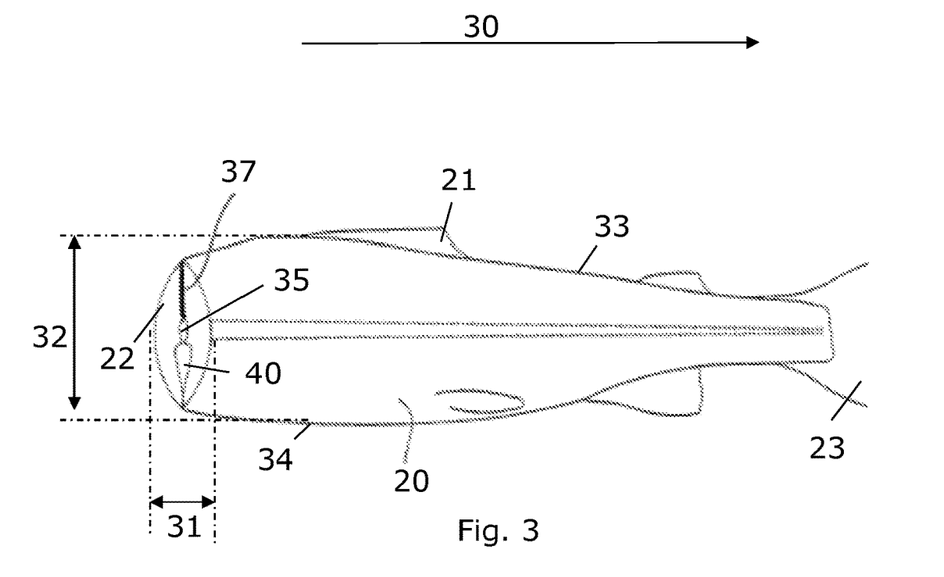

FIG. 3 illustrates the fish with certain dimensions as they are defined herein.

The fish extends in a lengthwise direction indicated by the arrow 30 from the front end 22 to the tail 23. The fish has a width from the left side to the right side. The width is indicated by arrow 31. The height of the fish is indicated by the arrow 32 and defines the distance between the margin of the dorsal part margin 33 and the margin of the ventral part margin 34.

The dorsal part of the fish is the part extending upwardly from the vertebral column 35 to the margin of the dorsal part 33 of the fish. The ventral part of the fish is the part extending downward from the vertebral column 35 to the margin of the ventral part 34. The vertical centre plane is a longitudinally extending vertical plane intersecting through the middle of the vertebral column centrally between the two fillets.

The illustrated fish is salmon (Salmo salar), a species of ray-finned fish in the family Salmonidae, but the machine may fillet other species of fish.

When entering the machine, the fish is gutted, i.e. the abdomen is cut open and intestines are removed. The open abdomen 40 is illustrated in FIGS. 3 and 4, and the line 37 illustrates a dorsal filleting cut in FIG. 3.

Figure 4:
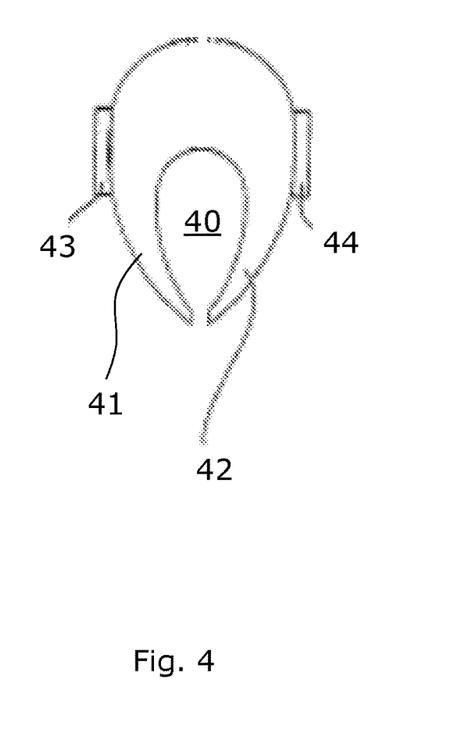

FIG. 4 illustrates a cross section of the fish with the open abdomen 40 providing free right and left side margin of the ventral parts 41, 42 on opposite sides of the vertical centre plane. FIG. 4 also indicates conveyor belts 43, 44 engaging opposite sides of the fish.

As the fish progresses through the machine 1, it will pass several stations and eventually the fillets, essentially free from bones, will be delivered at the outfeed 5, e.g. for further processing or packaging.

Figure 5:
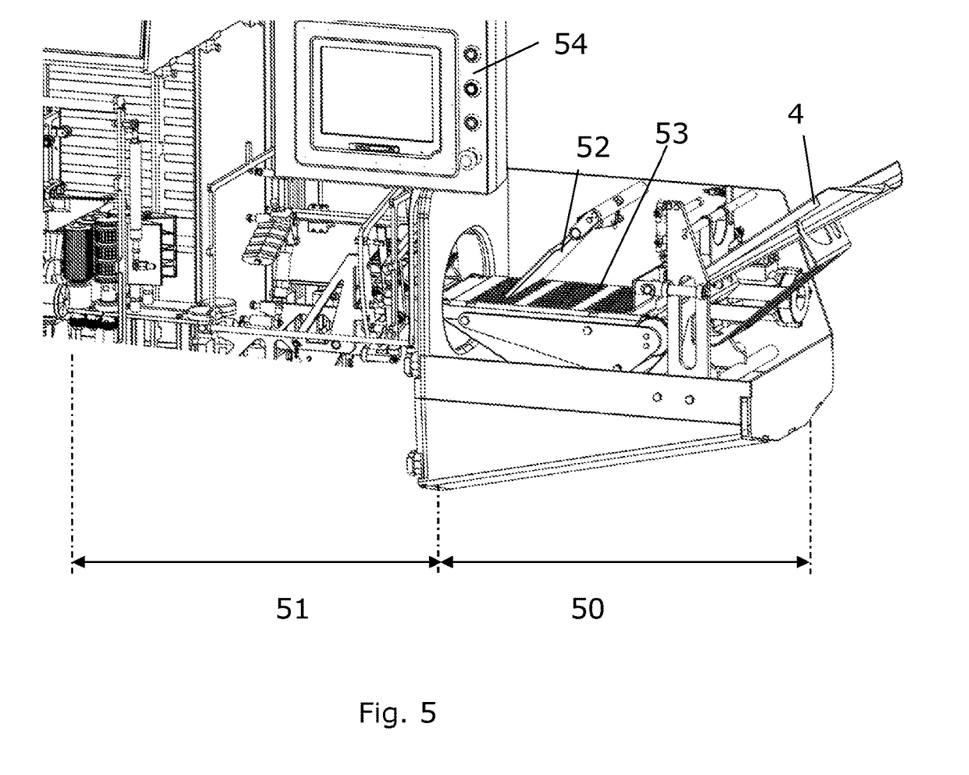
FIG. 5 illustrates a device for detecting the width of the fish.

FIG. 5 illustrates details of the infeed 4 formed as a chute. FIG. 5 further illustrates a station 50 and a station 51. The station 50 comprises means for detecting the width of the fish. The width of the fish is determined by the rotation of the plate 52 which is lifted by the fish lying on a side, when the fish is conveyed on the belt 53 under the plate. The determined width is transmitted to a computer control unit 54 and used by several processes.

The subsequent station 51 is an infeed system configured for receiving and turning the fish from a sideways orientation with the width dimension in an upwards direction, to an upwards orientation with the margin of the dorsal part of the fish pointing upwards. FIG. 5 only illustrates parts of the infeed system, and further details may be found e.g. in WO2018146203A1 incorporated herein by reference.

In the upwards orientation, the fish is received by the conveying system of the machine.

The conveying system is illustrated in FIGS. 6-9 and comprises endless belts on opposite sides of the vertical centre plane. The endless belts engage the fish and conveys the fish through the machine. The position of the fish can be determined by registering the progress of the endless belt. The endless belts are provided with biasing means which urges the endless belt into a firm contact with the fish to be processed. Typically, the surfaces of the endless belts are provided with a surface pattern, e.g. comprising spikes, to ensure a firm grip and prevent sliding between the surface of the belt and the fish.

Figure 6:
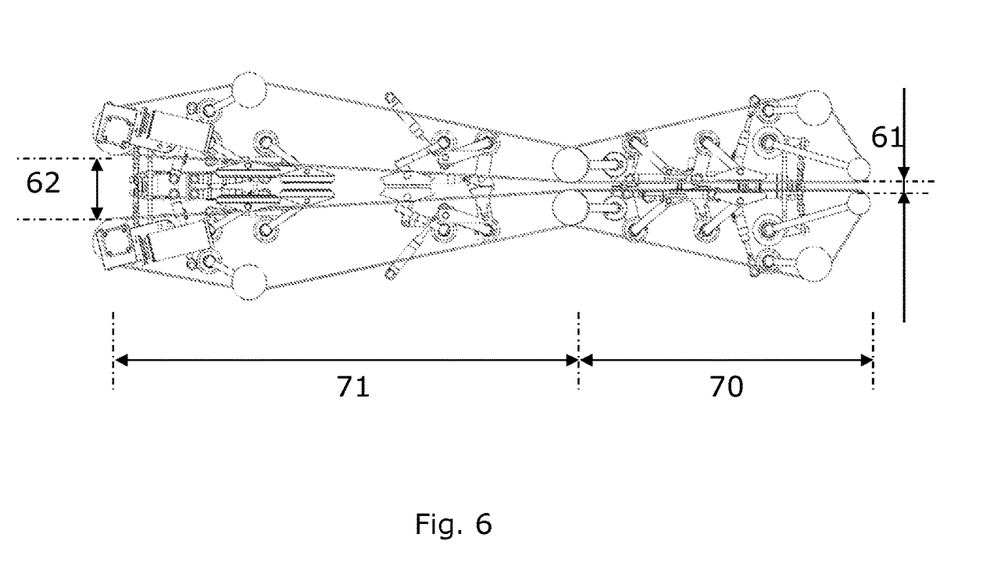
FIGS. 6-9 illustrate the conveying system of the machine.

FIG. 6 illustrates the conveying system seen from above and illustrates an entrance gap where the fish is received from station 51. The gap is illustrated by the arrow 61. The exit gap 62 is where the fish fillets and skeleton leave the machine.

Figure 7:
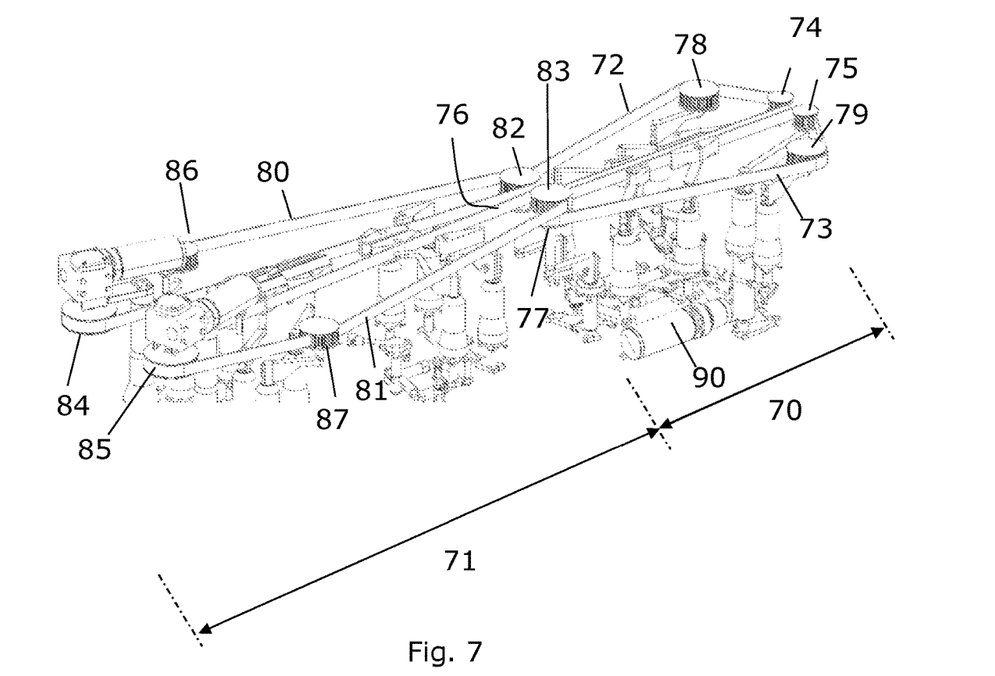

In FIG. 7 is illustrated that the conveying system forms an upstream conveying section 70, and a downstream conveying section 71. The upstream conveying section 70 comprises a first endless belt 72 on one side of the vertical centre plane, and a second endless belt 73 on the opposite side of the vertical centre plane.

The belts of the upstream section 70 extending between upstream pulleys 74, 75 and downstream pulleys 76, 77. The belts are driven by the drive pulleys 78, 79.

The upstream pulleys define the entrance gap 61, illustrated in FIG. 6, i.e. where the fish can be received between the upstream pulleys.

Figure 9:
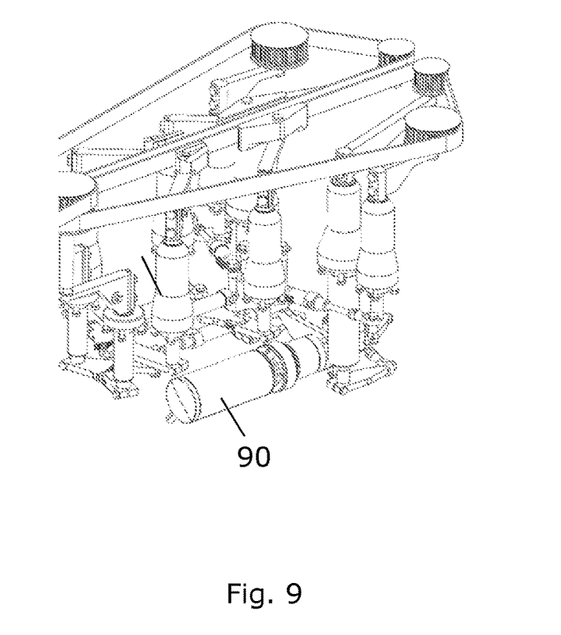

The machine comprises an entrance gap controller configured to read the width of the fish which is detected in the station 50, and to control a position of the upstream pulleys by use of the servo motor 90 illustrated enlarged in FIG. 9.

By changing position of the upstream pulleys relative to each other, the size of the entrance gap is changed actively by the servomotor controlled by the entrance gap controller to cope with the width of the fish and thereby provide a pre-determined clamping pressure from the belts onto the fish.

The downstream conveying section forms a third endless belt 80 on one side of the vertical centre plane, and a fourth endless belt 81 on the opposite side of the vertical centre plane. The third and fourth endless belts extend between an upstream pulley 82, 83 and a downstream pulley 84, 85, and they are driven by drive pulleys 86, 87.

Figure 8:
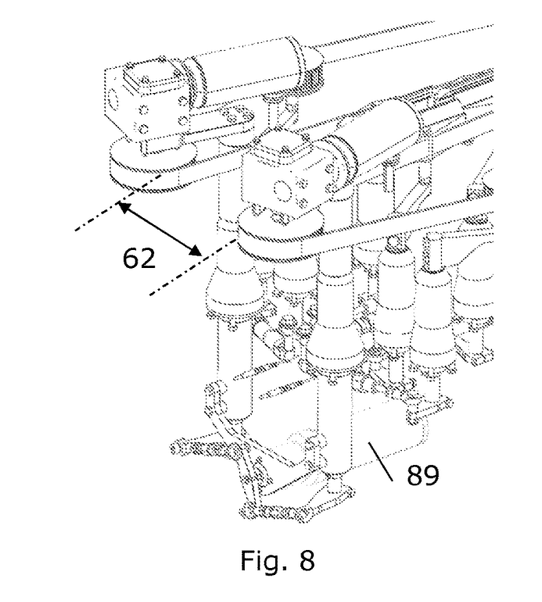

An exit gap 62, c.f. FIG. 8, is defined between the downstream pulleys 84, 85 for delivering the sequence of fish after they are split into two fillets and a skeleton. The three pieces of fish are delivered between the third and fourth endless belts 80, 81 at the exit gap.

The machine comprises an exit gap controller embedded in the computer control unit 54. The exit gap controller is configured to read the detected width and to control a position of at least one of the downstream pulleys 84, 85 by use of the servomotor 89. The machine can thereby apply a controllable clamping pressure from the belts onto the fish at the point of delivery. This reduces the risk of damaging the fillets.

FIG. 7 illustrates that the first and second endless belts, i.e. the belts of the upstream conveying section, extend in a first height, i.e. a first level in the upwards direction. The third and fourth endless belts, i.e. the belts of the downstream conveying section, extend higher up, i.e. in a second level in the upwards direction.

Figure 10:
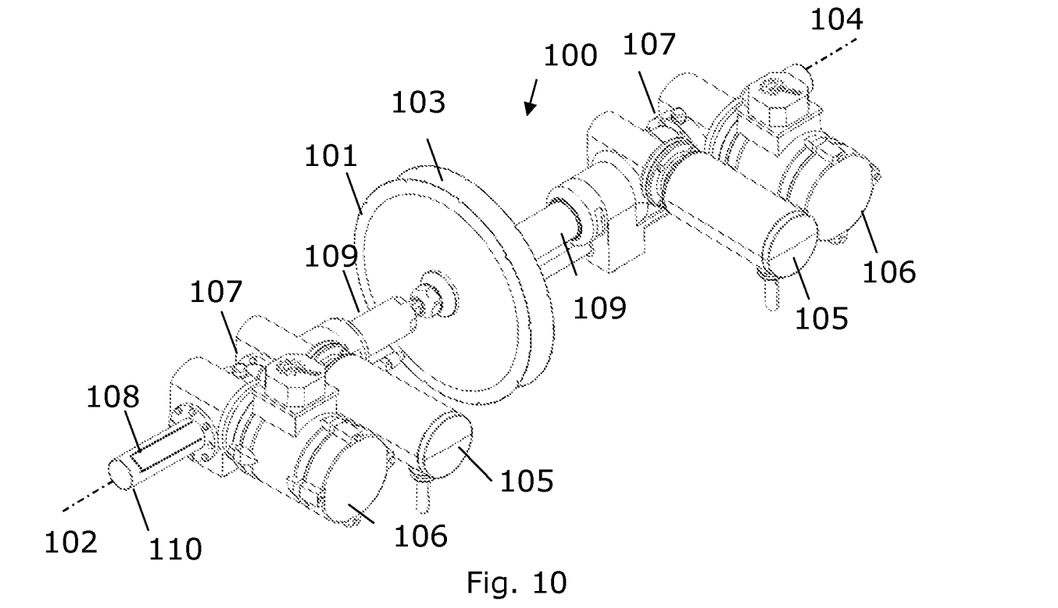
FIG. 10 illustrates a dorsal-filleting station.

One of the plane cut filleting stations between the infeed 4 and the outfeed 5 constitutes a ventral-filleting station 100. The ventral-filleting station is arranged to cut the fish along the margin of the ventral part of the fish while the fish is conveyed.

Figure 11:
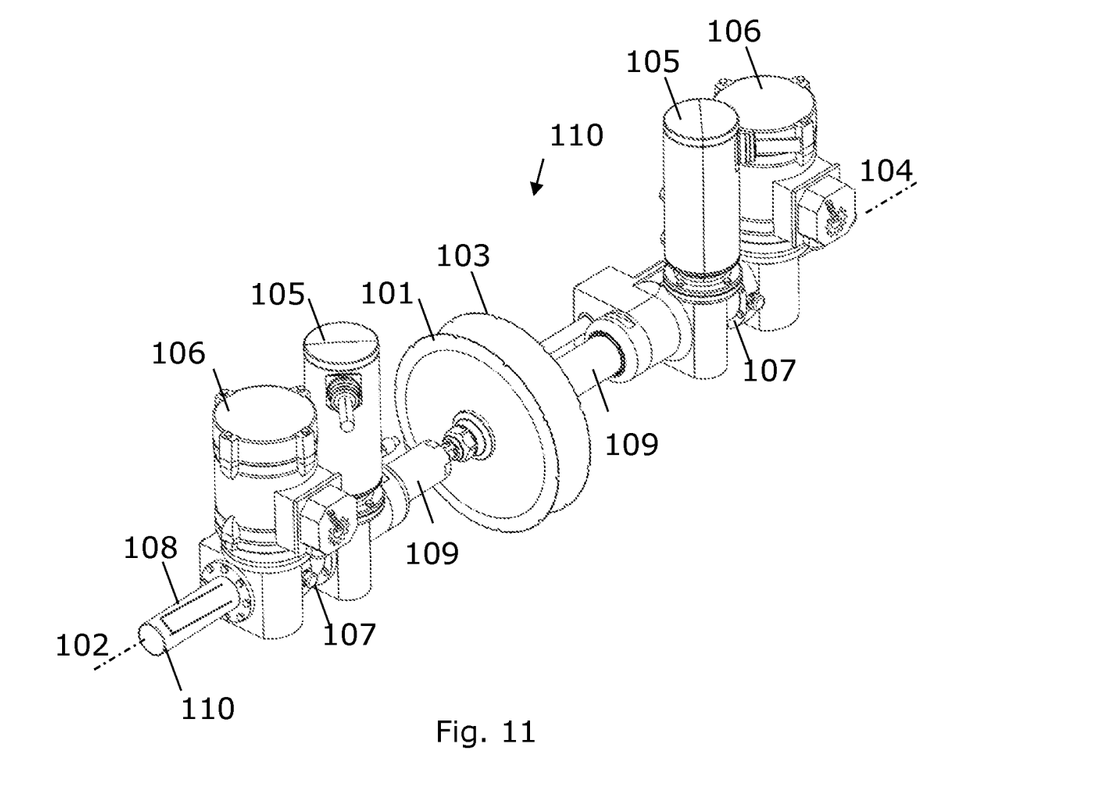
FIG. 11 illustrates a ventral-filleting station.

Another of the plane cut filleting stations between the infeed 4 and the outfeed 5 constitutes a dorsal-filleting station 110 arranged to cut the fish along the margin of the dorsal part of the fish while the fish is conveyed.

Typically, the dorsal-filleting station is located downstream relative to the ventral-filleting station.

The ventral-filleting station is illustrated in FIG. 10, and the dorsal-filleting station is illustrated in FIG. 11. Both filleting stations comprise a pair of rotating blade knifes, and they will be explained with the same reference numbers for functionally identical features.

The filleting stations comprise a first cutting blade 101 arranged on one side of the vertical centre plane. The first cutting blade is configured for cutting the fish during rotation of the first cutting blade about a first rotation axis 102.

A second cutting blade 103 is arranged on the opposite side of the vertical centre plane. The second cutting blade rotates about a second rotation axis 104 which is angled relative to the first rotation angle.

Both the dorsal-filleting station and the ventral-filleting station comprise a gap control structure embedded partly in the computer control unit 54 and constituted partly by the displacement motor 105.

The gap control structure is configured to read the detected width of the fish and configured to move the cutting blades relative to each other to change the gap between the cutting blades. The gap control structure is configured to make this adjustment while the fish is conveyed past the respective filleting station, and thus while the fish is cut by the cutting blades.

The position of the cutting blades is changed by the displacement motor 105 in the form of a linear actuator which can move the blades towards or away from each other. During this movement, the blade 101, 103 is maintained at a fixed angle relative to the conveying direction of the fish.

Additionally, the filleting station comprises a rotation motor 106 arranged for each cutting blade to rotate the corresponding cutting blade.

As illustrated, the movement of the cutting blades is carried out by individual linear actuators for each blade, and each blade may therefore move inwards towards the other blade, and outwards, away from the other blade, individually. However, the gap control structure is configured both for individual movement and for a synchronized movement where both blades of a set of blades move simultaneously towards or away from the other blade, i.e. symmetrically relative to the vertical centre plane. During this movement, the angle of the circular blade is still fixed.

The transitional axe for the linear movement is perpendicular to the circular blades, i.e. it moves the blades in the direction of the rotation axes. The rotation axes are, however, not parallel, and the inward and outward movement to adjust the gap is therefore not necessarily perpendicular to the conveying direction.

The displacement motor 105 and the rotation motor 106 are formed in a cutting unit, i.e. formed as one single component, where both the displacement motor and the rotation motor are fixed to one and the same chassis 107. Accordingly, both motors are non-elastically joined, and they can be attached to and removed from the machine as one single component without need for adjustment between the motors.

The machine comprises four of these units, i.e. two units arranged opposite each other to form the dorsal-filleting station and two units arranged opposite each other to form the ventral-filleting station.

Each unit is fixed reversibly to the machine e.g. by bolts, and they are cabled with a plug interface to the machine. During service or repair of the machine, each of the four units can be removed independently, and when the plug interface is attached to the machine, the computer control unit 54 can control the unit and thus create the desired gap by use of one or both displacement motors 105 of a station.

In one implementation, the cutting blade 101, 103 is rotated by a drive shaft 108 suspended rotationally in an outer tube 109. The drive shaft is illustrated with dotted lines since it is encapsulated inside a protection shield 110, and therefore not visible on the assembled unit.

The outer tube 109 defines a bearing structure and holds the blade rotationally fixed to the machine. The displacement motor 105 moves the outer tube in the direction of the rotation axis 102, 104. For effecting this movement, the outer tube 109 is slidingly suspended in the chassis 107, and the displacement motor may engage the outer tube 109 e.g. via a spindle engagement or any similar kind of gear-wheel engagement. When the outer tube and cutting blade is shifted back and forth, the drive shaft 108 moves back and forth inside the protection shield 110 which is sufficiently long to provide space for the lateral movement of the drive shaft. The rotation motor 106 is arranged to engage the drive shaft and to rotate the drive shaft and the blade even while the outer tube and blade is shifted sideways by use of the displacement motor 105. For this to happen, the drive shaft may be formed with a longitudinally extending tooth structure and the rotation motor 106 may engage with this tooth structure by a tooth wheel which can slide longitudinally along the tooth structure while the outer tube and blade is shifted sideways.

Figure 12:
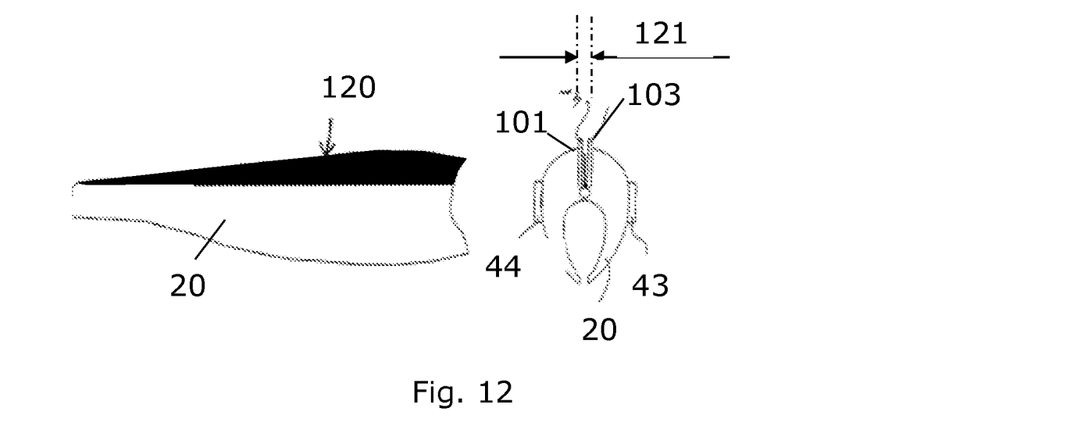
FIG. 12 illustrates cutting performed by the dorsal-filleting station.

FIG. 12 illustrates the result of the cutting provided by the dorsal-filleting station. The cut is illustrated by the dark area 120 and extends along the entire length of the fish. The linear movement of the blades towards or away from each other changes the gap without influencing the angle of the cut. This is illustrated by the arrow 121.

As a result of the gap control structure adjusting the gap the slit in the dorsal part of the fish can be varied over the length of the fish without influencing the cutting angle.

Figure 13:
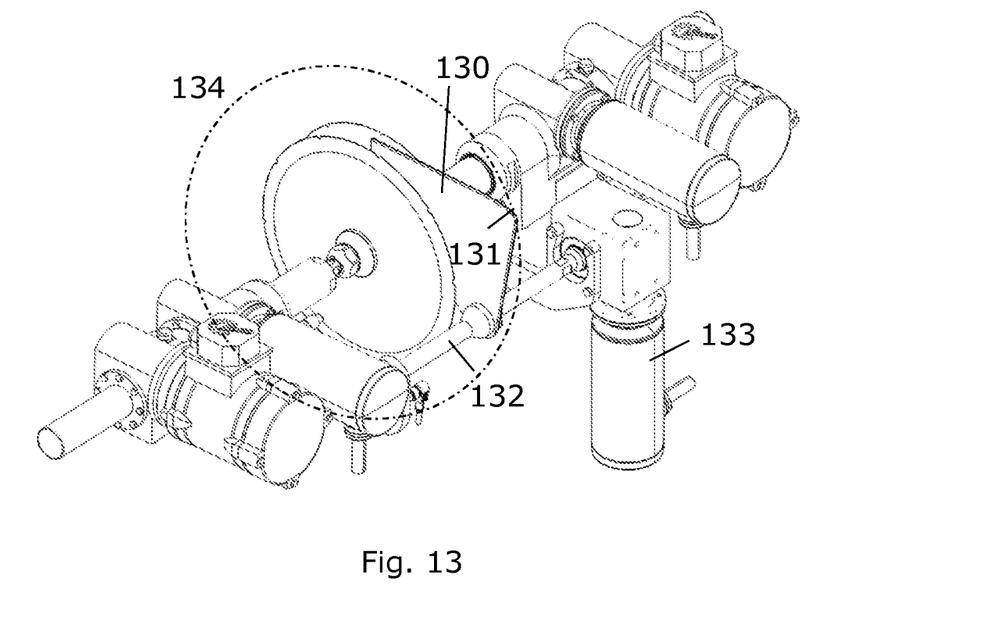
FIG. 13 illustrates a lifting structure.

FIG. 13 illustrates a lifting structure 130 arranged to lift the fish and prevent the ventral-filleting station from separating the ventral ribs from the vertebral column.

The lifting structure 130 defines a plate defining a lifting point 131 located in a corner of the plate. The plate is fixed to a drive shaft 132 powered by the motor 133, and the lifting point can thereby follow the circle periphery indicated by the dotted line 134. The circle periphery is in the vertical centre plane.

The lifting point follows a sequence when it rotates, the sequence is described below.

step 1) the fish enters the machine, and the lifting point is below the level of the vertebral column of the fish.

step 2) the fish enters the ventral-filleting station, and the lifting point rotates to a point where it engages and lifts a vertebral column point along lower edge of the vertebral column of the fish.

step 3) the lifting point moves in contact with the vertebral column in the downstream direction. Particularly, the lifting structure may rotate with a speed which is adjusted to the speed of the conveying structure such that the vertebral column point follows exactly the point on the fish where it engages the fish.

step 4) after having travelled a certain distance in downstream direction, the vertebral column point disengages the vertebral column point, and rotates to a waiting position and waits for the next fish in the sequence of fish.

step 5) corresponds to step 1) and the sequence is repeated.

Figure 14:
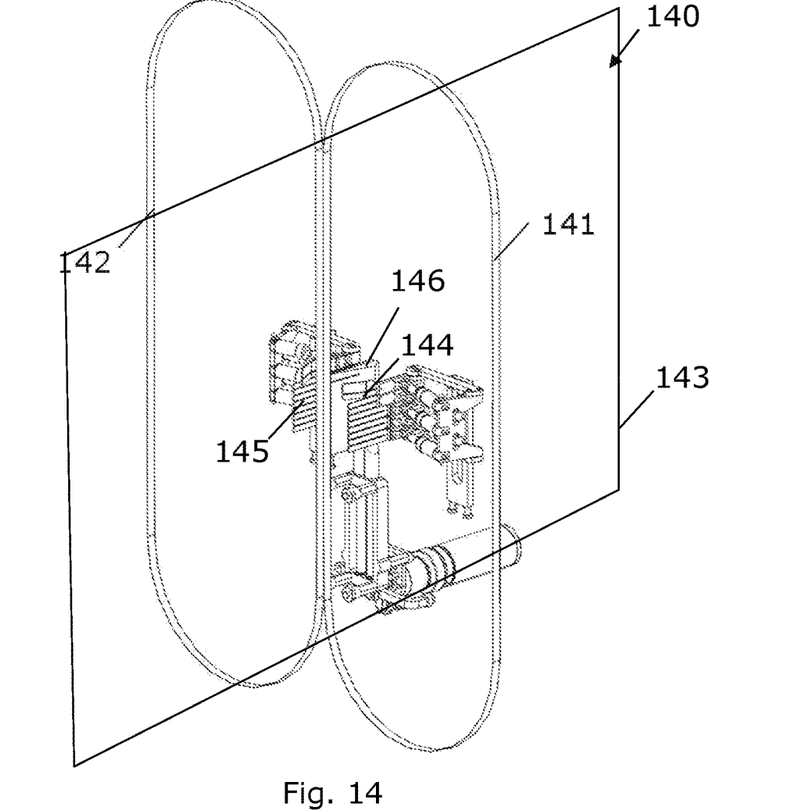
FIG. 14 illustrates a band knife structure and belly plates.

FIG. 14 illustrates a band knife structure 140 of the machine. The band knife structure is arranged downstream relative to the filleting stations and comprises two flexible rotating closed-loop knife bands 141, 142 rotating about pulleys, not shown in FIG. 14, but illustrated with no 6 in FIG. 1.

The knife bands are arranged to make a curved cut on opposite sides of the vertebral column while the fish is advanced between the two belts.

The vertical centre plane 143 extends centrally between the two knife bands.

The machine comprises a pair of squeezing nippers 144, 145. The squeezing nippers are arranged to provide a squeeze pressure on the right and left sides of the fish towards the two belts. Additionally, the machine comprises the belly plate structure 146 illustrated in FIG. 15.

Figure 15:
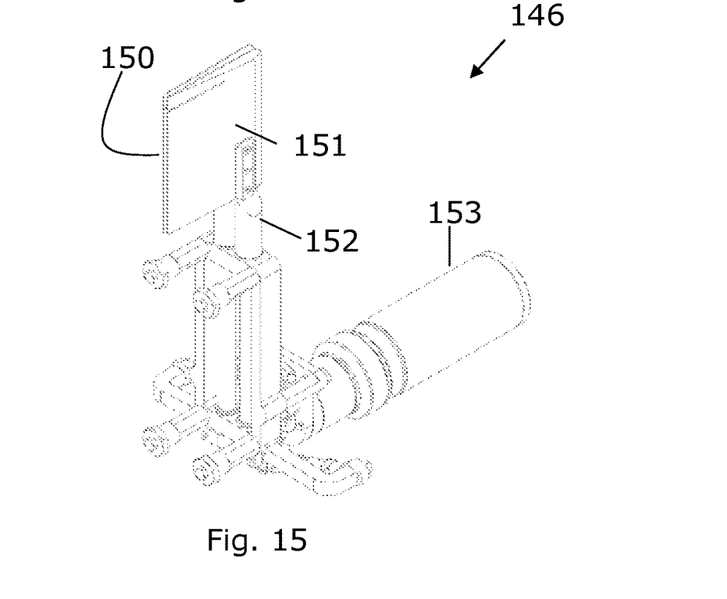
FIG. 15 illustrates the belly plate structure in the machine.

The belly plate structure comprises right and left side belly plates 150, 151. The fish is conveyed to a position where the belly plates are between the free right and left side margin of the ventral parts 41, 42. The right and left side belly plates are on opposite sides of the vertical centre plane 143, and they are arranged to press the margin of the ventral parts of the fish away from each other against the squeezing pressure from the nippers. This pressure from the belly plates places the margin of the ventral parts in a position where the band knifes cut the meat free from the ventral ribs.

The belly plates are movable by a belly plate motor structure with individual belly plate arms 152 movable in a direction transverse to the vertical centre plane 143 by a motor 153. The motor is controlled based on the width of the fish, detected in station 50. This allows the belly plates to be positioned very precisely and thus optimizes the yield by placing the margin of the ventral parts such that the band knives cut the ventral ribs off the fillets without cutting into the fillets. During this process, the ribs are pressed towards the centre plane while cutting along the ribs, outside the ribs. In this way, the fillet is released from the ribs with a low amount of meat on the ribs.

The invention claimed is:

1. A machine for filleting fish, the machine comprising: filleting stations, a conveying system configured to convey a sequence of fish in a downstream direction through the filleting stations while each fish of the sequence of fish is oriented with a back side of the fish facing in an upwards direction and with right and left sides of the fish on opposite sides of a vertical centre plane, and at least one width detection mechanism placed at an upstream location relative to the filleting stations and configured for detecting a width of the fish, wherein at least one of the filleting stations is a plane cut filleting station comprising:

a first cutting blade arranged on one side of the vertical centre plane and configured for cutting the fish during rotation of the first cutting blade about a first rotation axis, a second cutting blade arranged on the opposite side of the vertical centre plane and configured for cutting the fish during rotation of the second cutting blade about a second rotation axis, and a gap control structure configured based on the detected width of the fish to change a gap between the first cutting blade and the second cutting blade while the fish is being cut.

2. The machine according to claim 1, wherein each plane cut filleting station is configured to maintain a fixed angle between the first cutting blade and the second cutting blade during changing of the gap.

3. The machine according to claim 1, wherein the gap control structure is configured to change the gap by linear movement of both cutting blades in an inwards direction towards each other or in an outwards direction away from each other.

4. The machine according to claim 3, wherein the gap control structure is configured to change the gap by linear movement of each of the first and second cutting blades in the direction of the corresponding rotation axis.

5. The machine according to claim 1, wherein the first rotation axis is non-parallel with the second rotation axis.

6. The machine according to claim 1, wherein one of the at least one filleting station forms a ventral-filleting station arranged to cut the fish along a margin of the ventral part of the fish.

7. The machine according to claim 1, wherein one of the at least one filleting station forms a dorsal-filleting station arranged to cut the fish along a margin of the dorsal part of the fish.

8. The machine according to claim 1, wherein the gap control structure is configured to change the gap by movement of both cutting blades symmetrically relative to the vertical centre plane.

9. The machine according to claim 1, comprising:

a band knife structure arranged downstream relative to the at least one filleting station and comprising two flexible rotating closed-loop knife bands arranged to provide a curved cutting on opposite sides of a vertebral column of the fish while the fish is advanced between the two belts, a pair of squeezing nippers arranged to provide a squeeze pressure on the right and left sides of the fish towards the two belts, a belly plate structure comprising right and left side belly blades arranged to define a belly plate gap between the belly plates and arranged to press right and left sides of a belly part of the fish away from each other against the squeezing pressure, and a belly plate motor structure controlled based on the width of the fish to vary the belly plate gap between the belly plates depending on the width of the fish.

10. The machine according to claim 1, wherein at least one of the plane cut filleting stations comprises a height control structure configured to change the height of the first cutting blade and the second cutting blade while the fish is being cut.

11. The machine according to claim 10, comprising at least one height detection mechanism placed at an upstream location relative to the filleting stations and configured for detecting a height of the fish and wherein the height control structure is configured to change the height of the first cutting blade and the second cutting blade based on the detected height of the fish.

12. The machine according to claim 1, comprising at least one length detection mechanism placed at an upstream location relative to the filleting stations and configured for detecting a length of the fish and wherein at least one of the gap control structures and the height control structure is configured to change the gap or the height of the first cutting blade and the second cutting blade based on the detected length of the fish.

13. The machine according to claim 1, wherein the first cutting blade is formed in a first cutting unit with at least a part of the gap control structure, the first cutting unit comprising a rotation motor arranged to rotate the first cutting blade, and a displacement motor arranged to move the cutting blade along the first rotation axis.

14. The machine according to claim 13, wherein the first cutting unit is reversibly attachable and detachable from the remaining machine as one single unit.

15. The machine according to claim 13, wherein the second cutting blade is formed in a second cutting unit being identical to the first cutting unit or constitutes the first cutting unit mirrored in the centre plane.

16. The machine according to claim 1, wherein the first cutting unit comprises a drive shaft extending in the direction of the first rotation axis, the drive shaft being connected to the cutting blade, being rotated by the rotation motor, and being displaced by the displacement motor.

17. The machine according to claim 1, wherein the elongated drive shaft is configured to allow linear displacement while a rotational engagement between the drive shaft and the rotation motor remains during the displacement.

18. The machine according to claim 17, wherein the rotational engagement comprises an engagement of a drive wheel of the rotation motor and an elongated cogwheel structure extending in the direction of the first rotation axis on an outer surface of the drive shaft.

19. A method of filleting fish by use of a machine according to claim 1, the method comprising moving the first and second cutting blades towards each other or away from each other without changing the angle between the blades, the blades being moved while they are cutting the fish.

20. A machine for filleting fish, the machine comprising:

a conveying system configured to convey a sequence of fish in a downstream direction through at least one filleting station while each fish of the sequence of fish is oriented with a back side of the fish facing in an upwards direction and with right and left sides of the fish on opposite sides of a vertical centre plane, at least one filleting station arranged to cut the fish while the fish is conveyed, and at least one width detection mechanism placed at an upstream location relative to the filleting stations and configured for detecting a width of the fish, wherein the conveying system forms an endless belt on one side of the vertical centre plane, and an endless belt on the opposite side of the vertical centre plane, each of the endless belts extending between an upstream pulley and a downstream pulley, and wherein an entrance gap is defined between the upstream pulleys for receiving the sequence of fish between the first and second endless belts, the machine further comprising an entrance gap controller configured to read the detected width and to control a position of at least one of the upstream pulleys relative to the position of the other upstream pulley to change the entrance gap based on the width.

* * * * *